US007090795B2

(12) United States Patent
Wu

(10) Patent No.: US 7,090,795 B2
(45) Date of Patent: Aug. 15, 2006

(54) METHOD FOR MAKING FIGURES/STRIPES ON AN ARTICLE AND THE ARTICLE MADE BY THE METHOD

(75) Inventor: Jerry Wu, Taichung Hsien (TW)

(73) Assignee: Ching Fen Chu, Taichung Hsien (TW)

( * ) Notice: Subject to any disclaimer, the term of this patent is extended or adjusted under 35 U.S.C. 154(b) by 297 days.

(21) Appl. No.: 10/618,754

(22) Filed: Jul. 15, 2003

(65) Prior Publication Data

US 2005/0013944 A1 Jan. 20, 2005

(51) Int. Cl.
*B29C 70/30* (2006.01)

(52) U.S. Cl. ...................... 264/132; 264/136; 264/137; 264/161; 264/162; 264/257; 264/258; 264/324

(58) Field of Classification Search ........ 264/257–258, 264/132, 136–137, 161–162, 324
See application file for complete search history.

(56) References Cited

U.S. PATENT DOCUMENTS 4,645,556 A * 2/1987 Waugh et al. .............. 156/242

* cited by examiner

*Primary Examiner*—Stefan Staicovici
(74) *Attorney, Agent, or Firm*—Troxell Law Office, PLLC

(57) ABSTRACT

A method for making figures/stripes on an article, including steps of: preparing a substrate; wrapping an outer surface of the substrate with a fiberglass fabric drenched with resin; placing at least one thin or slender covering material on an outer face of the fiberglass fabric, the substrate, fiberglass fabric and the covering material together forming a wrapping body; using a binding means to bind the wrapping body to harden and pattern the fiberglass fabric; taking off the binding means after the wrapping body is hardened and patterned, whereby the fiberglass fabric is hardened to form an inner layer, the covering material positioned on the inner layer and forming the figures/strips; painting an outer resin on an outer face of the wrapping body after the outer resin is hardened; and buffing the hardening layer to complete the article.

22 Claims, 7 Drawing Sheets

METHOD FOR MAKING FIGURES/STRIPES ON AN ARTICLE AND THE ARTICLE MADE BY THE METHOD

BACKGROUND OF THE INVENTION

The present invention is related to a method for making figures/stripes on an article. The figures/stripes of the article are richly variable. The stripes and figures are protected from being worn. In addition, the figures/stripes of the article are unique and personal.

Figures/stripes are often made on the surfaces of various commercial products such as gifts, stationeries, sport implements and leisure implements. The figures/stripes beautify the appearance of the product and enhance the quality thereof or serve as a brand of the product.

There are many conventional methods for making figures or characters (figures/stripes) on the surface of an article, for example, printing, transfer printing, spraying and adhesion. By any of the above methods, the figures/stripes are directly formed on the surface of the article. After a period of use, the figures/stripes tend to be worn out. The worn figures/stripes will be incomplete. This results in random appearance of the article and destructs the quality of the article.

The conventional figure/stripe making methods have other shortcomings as follow:

For example, by means of printing, the figures/stripes formed on the article will be the same and monotonous. By means of spraying or adhesion (attachable paper), the figures/stripes formed on the article still will be the same. In other words, the figures/stripes made on the article by means of the conventional methods are unchangeable and lack uniqueness.

In addition, according to the conventional figures/stripes making methods, it is necessary to first manufacture a plate for making the figures/stripes. For example, with respect to printing, it is necessary to first manufacture a type-face (so-called plate-making). Similarly, with respect to spraying or adhesion, it is also necessary to manufacture the plate of the figures/stripes. It is costly to make the plate.

Moreover, the figures/stripes made of the conventional methods are formed on the article by way of manual processing. Therefore, the figures/stripes are stiff without natural feeling or solid feeling.

SUMMARY OF THE INVENTION

It is therefore a primary object of the present invention to provide a method for making figures/stripes on an article. The figures/stripes of the article are richly variable without monotonousness.

It is a further object of the present invention to provide the above method for making figures/stripes on an article in which the stripes and figures are protected from being worn and kept complete.

It is still a further object of the present invention to provide the above method for making figures/stripes on an article in which the figures/stripes of the article are solid.

It is still a further object of the present invention to provide the above method for making figures/stripes on an article in which the figures/stripes of the article are presented by natural material.

It is still a further object of the present invention to provide the above method for making figures/stripes on an article in which in the case that natural material is selected to present the figures/stripes, the cost for making the plate is saved.

It is still a further object of the present invention to provide an article made by the above method. The figures/stripes of the article make the article unique and personal.

The present invention can be best understood through the following description and accompanying drawings wherein:

DETAILED DESCRIPTION OF THE PREFERRED EMBODIMENTS

In the figure/stripe making method of the present invention, one or more covering material is overlaid on the surface of a substrate. Then a transparent hardening layer is manufactured around the substrate to form an article. The covering material is positioned between the substrate and the hardening layer to form the figure of the article.

According to a preferred embodiment, the figure/stripe making method of the present invention includes steps of:

1. Preparing a Substrate on which the Figure/Stripe is to be Made:

The substrate used in the present invention is a product used in various fields such as a gift, stationery, sport implement, tool and daily article. For example, the substrate can be a bicycle frame, sport implement body (racket frame, club, fishing rod, skateboard, etc.), exerciser frame, cup, bottle, column, tube, handset, pen, pen barrel, mouse, mobile phone case, hand tool or a kit. In other words, the article only needs to have a fixed profile.

Moreover, the shape of the article is not limited to any specific shape. The article only needs to totally or partially have a regular shape without too complicated configuration. The regular shape can be a plane face, a concave, a convex or a curved face. The article can have a solid pattern having plane faces, arched faces or curved faces. For example, the article can be a plate body, a rectangular solid body, a strip, a ball body, a polyhedral body, a cone, a cylinder, etc. Alternatively, the article can have a solid geometric pattern which is a combination of plane faces, curved faces and arched faces. For example, a cola bottle can be the article used in the present invention.

The material of the article is not limited. The article only needs to have a certain hardness. The article can be made of metal, non-iron metal or nonmetal material. For example, the article can be made metal material such as iron, aluminum, copper, etc. or non-iron metal or polymer material such as plastic, rubber, glass, etc. or ceramic material or enamel material or wooden material or bamboo material.

In general, the figures (pictures, stripes, characters or combinations thereof) are to be made on the article of the present invention.

Figure 1:
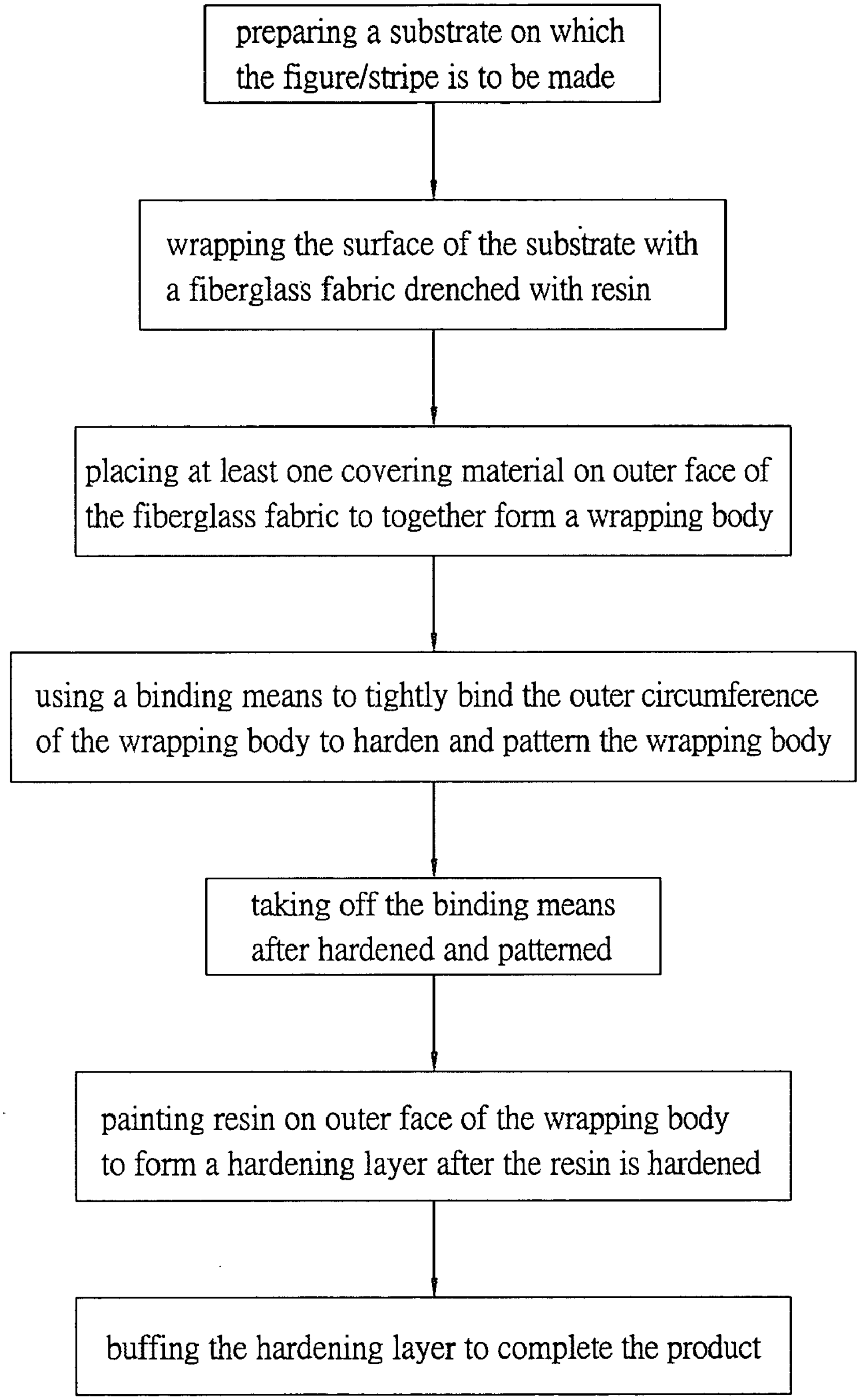
FIG. 1 is a flow chart of a first embodiment of the present invention.
Figure 2:
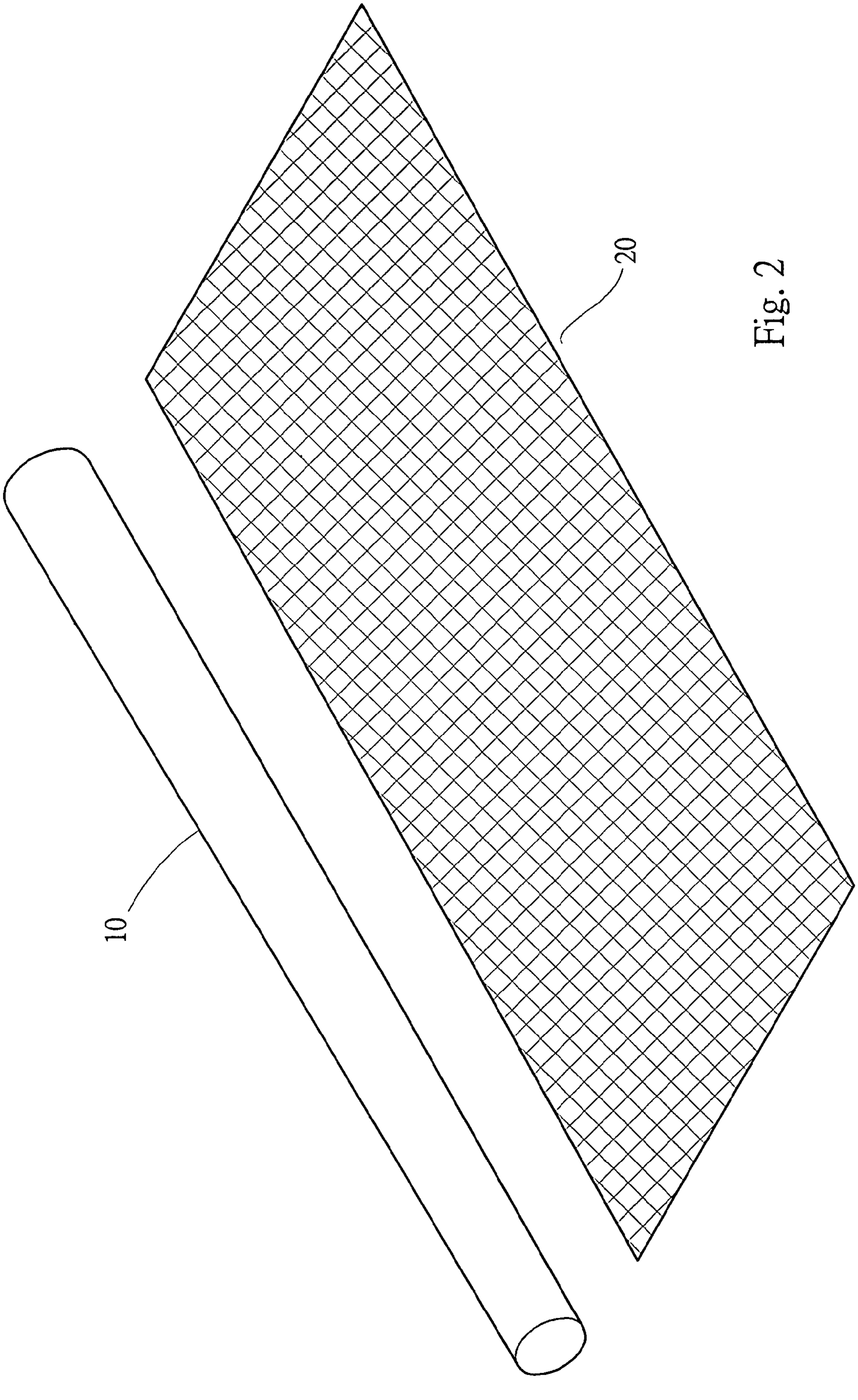
FIG. 2 shows a substrate and a fiberglass fabric.

2. Wrapping the Surface of the Substrate with a Fiberglass Fabric Drenched with Resin:

Referring to FIG. 2, a tubular substrate 10 is selected. Then the surface of the substrate 10 is wrapped with a fiberglass fabric 20 drenched with epoxy (resin) by way of rolling or fitting to form a bottom layer.

3. Placing at Least One Covering Material on Outer Face of the Fiberglass Fabric:

The covering material can be a thin sheet object made of various kinds of materials such as artificial or natural fiber-made fabric, paper, personal painting, character pattern, photograph, leaf, petal, etc. Alternatively, the thin sheet object can be made of polymer material, metal material, non-iron metal material or any other wire material or wooden material. Alternatively, the covering material can be a slender body such as a ribbon, a cloth belt, a thread, a metal wire or a nonmetal wire. Therefore, the covering material used in the present invention can be a natural material or an artificial material. Such articles are readily available and obtained in daily life. The thickness or diameter of the covering material used in the present invention is not larger than 5 mm (and preferably not larger than 2 mm).

Figure 3:
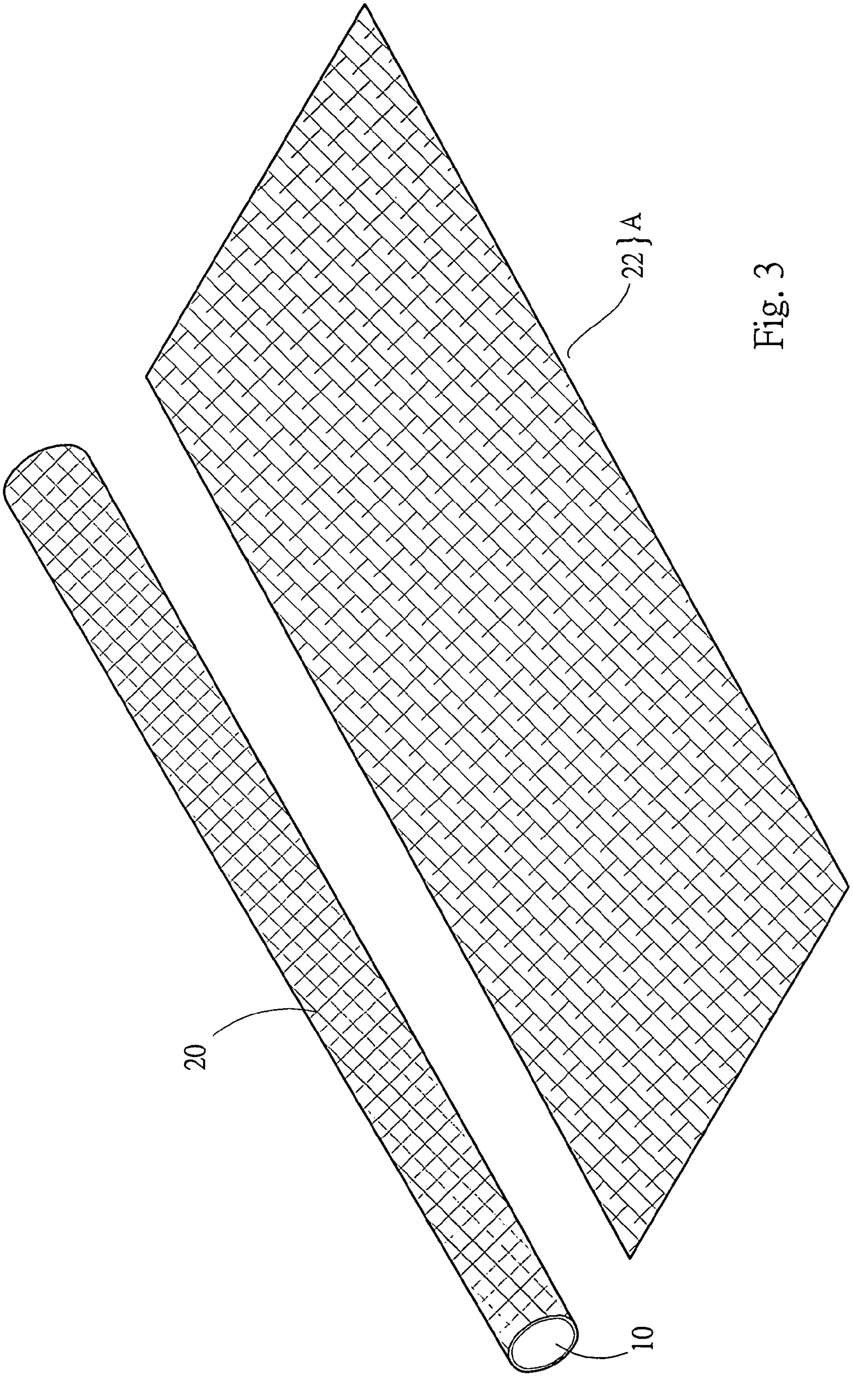
FIG. 3 shows the substrate wrapped by the fiberglass fabric and a covering material.
Figure 4:
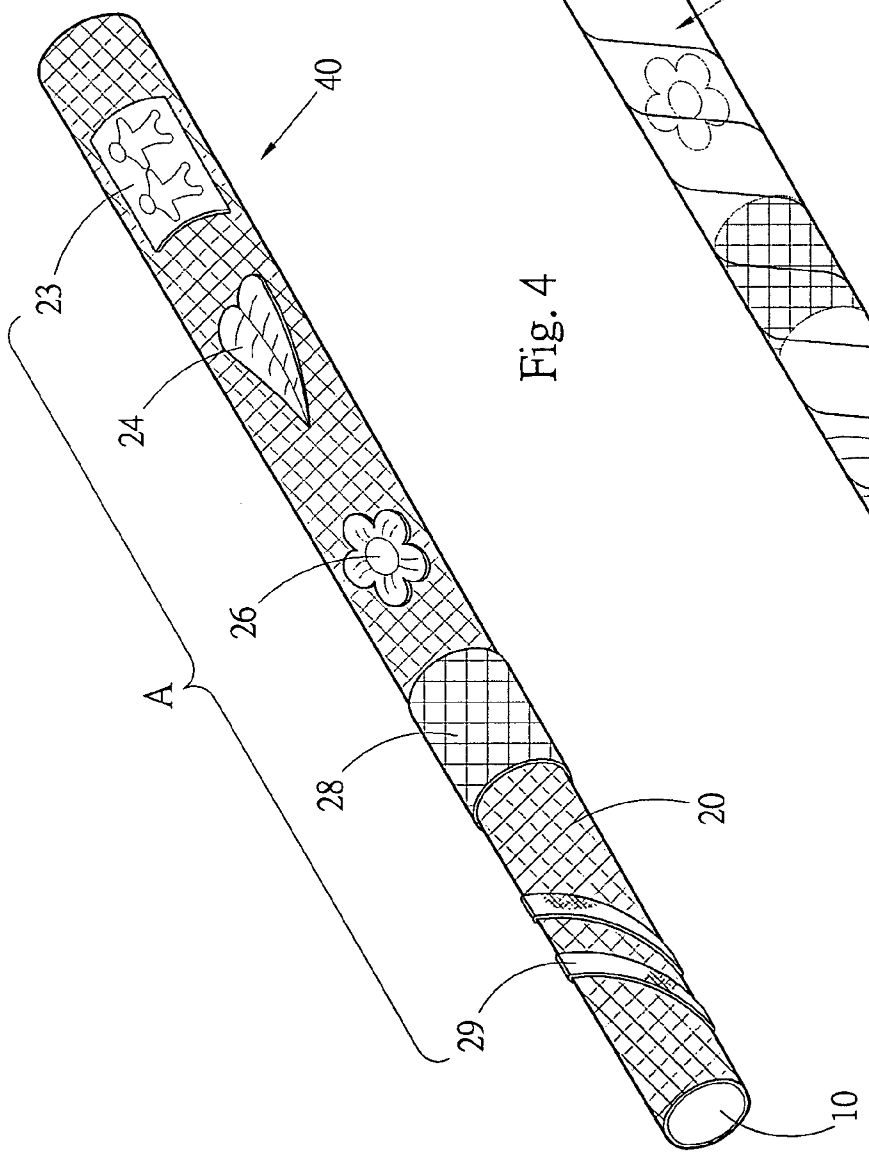
FIG. 4 shows that the substrate is covered by different covering materials.

The covering material serves as the figure formed on the surface of the article. After selected, the covering material is attached to and overlaid on the outer face of the fiberglass fabric 20. FIG. 3 shows that a fabric 22 serves as the covering material for wrapping the substrate. The fabric 22 can totally enclose the outer circumference of the substrate (actually the surface of the fiberglass fabric). However, in practice, the covering material A is only partially overlaid on the surface of the substrate. Referring to FIG. 4, a photograph 23, a leaf 24, a flower 26, a cloth 28 and a fabric strip 29 are overlaid on some parts of the surface of the substrate. Therefore, different covering materials can be selected according to the desired figure to be formed on the substrate and the covering material can totally or partially cover the substrate.

After wrapped by the fiberglass fabric and several covering materials, the substrate forms a multilayer wrapping body 40.

Figure 5:
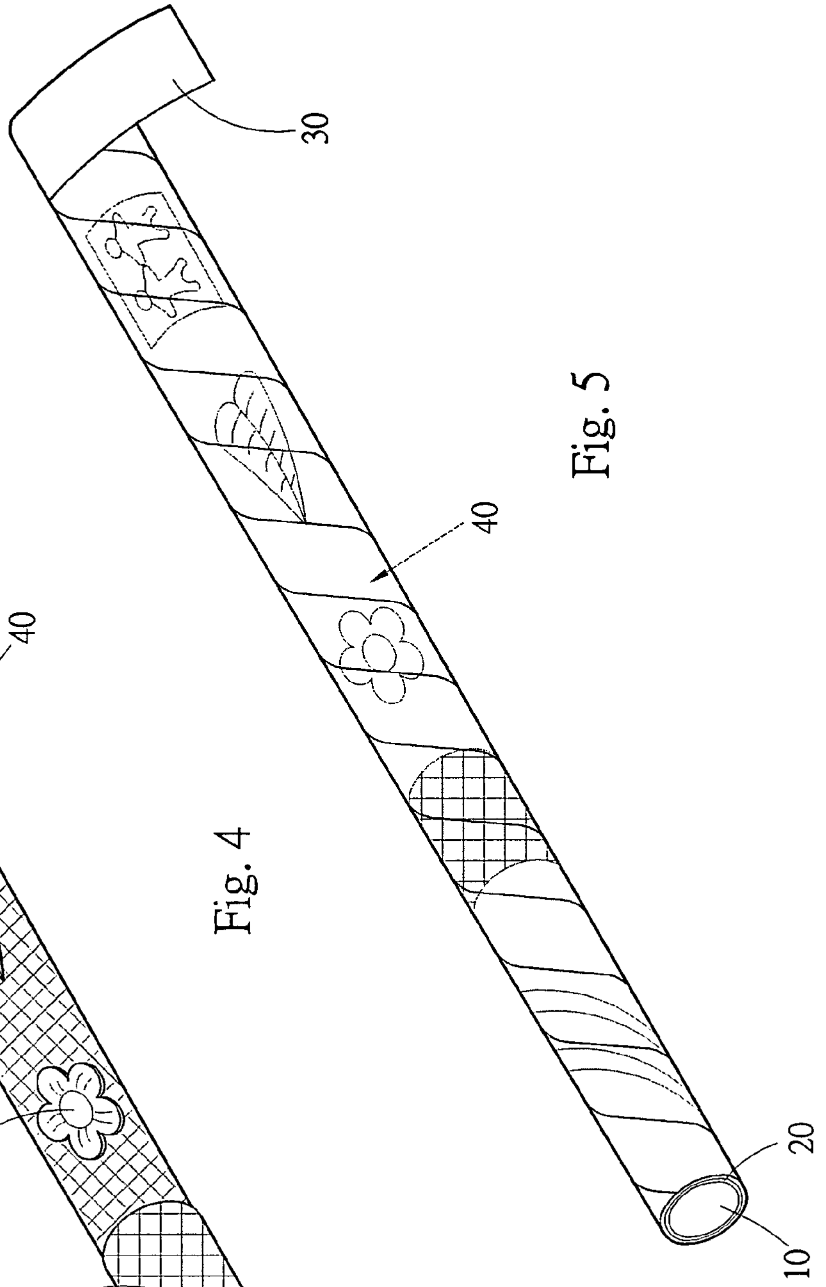
FIG. 5 shows that the wrapping body is bound by a binding means.

4. Using a Binding Means to Tightly Bind the Outer Circumference of the Wrapping Body to Harden and Pattern the Wrapping Body:

A conventional binding tape 30 (so-called OPP) which is a transparent heat-resistant plastic thin strip is wound around the wrapping body as shown in FIG. 5. The binding tape 30 serves to locate and pattern the fiberglass fabric and the covering material.

Then the wrapping body bound by the binding tape 30 is heated, hardened and patterned. The hardening is completed at normal temperature or higher temperature. At normal temperature, for example, 30° C., after 4 to 12 hours, the fiberglass fabric 20 can be hardened and patterned. At a higher temperature, for example, 130° C., after about two and half hours, the fiberglass fabric 20 can be hardened and patterned. A wooden or bamboo substrate can be hardened at room temperature. A metal, non-iron metal or polymer substrate can be hardened at higher temperature (below critical heat-resistant temperature of the substrate).

During the hardening procedure of the wrapping body bound by the binding tape 30, in the case that the covering material contains fiber components, for example, the covering material is a leaf or a petal containing natural fiber or the covering material is a paper or fabric containing artificial fiber, the epoxy contained in the fiberglass fabric 20 will infiltrate into the fiber of the covering material or even through the covering material to the surface thereof. Therefore, the fiberglass and the covering material can be well combined. This is an important characteristic of this embodiment of the present invention.

Figure 6:
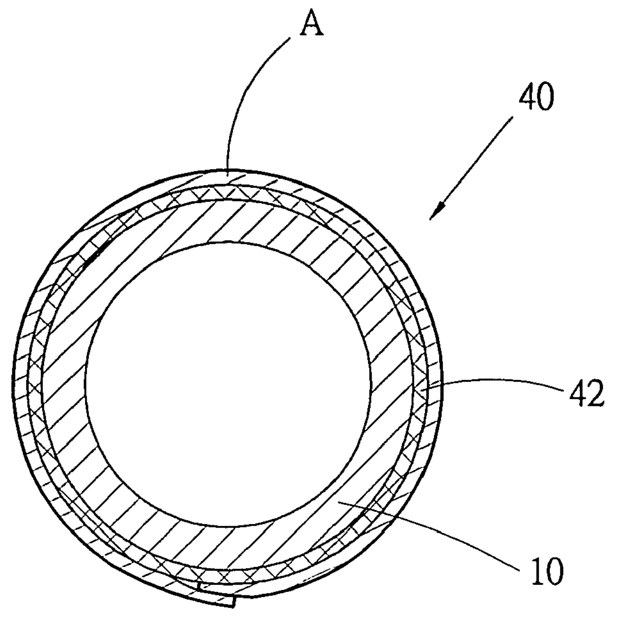
FIG. 6 is a sectional view showing the hardened and patterned wrapping body.

5. Taking Off the Binding Tape After Hardened and Patterned:

After the fiberglass fabric is completely hardened, the binding tape 30 is taken off and the wrapping body 40 is hardened and patterned. At this time, the fiberglass fabric forms a fiberglass layer as an inner layer 42 as shown in FIG. 6. The covering material A is positioned on the outer face of the inner layer 42. The fiberglass layer and the covering material are both patterned.

6. Painting Resin on Outer Face of the Wrapping Body to Form a Hardening Layer After the Resin is Hardened:

After the wrapping body 40 is hardened and patterned, the outer face of the wrapping body is painted with epoxy (resin). The resin can be painted onto the wrapping body or the wrapping body can be dipped into the resin, whereby the resin can attach to the surface of the wrapping body.

Figure 7:
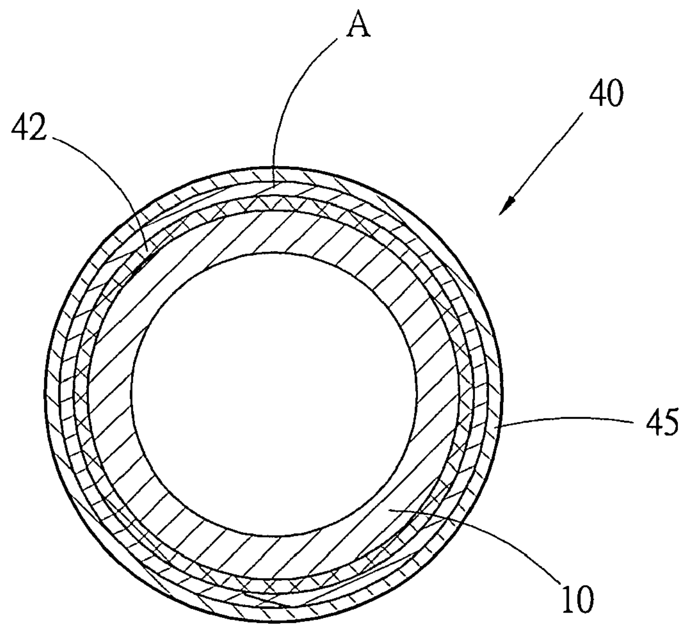
FIG. 7 is a sectional view of the product of the first embodiment of the present invention.

Thereafter, at room temperature, after about eight hours, at 80° C., after about two hours, the resin is hardened and patterned. Accordingly, the outermost circumference of the wrapping body 40 is formed with a transparent hardening layer 45 as shown in FIG. 7.

The painting operation of the resin can be many times repeatedly until the covering material A is totally covered without being exposed to outer side.

When painted to the surface of the wrapping body, the resin can fill up the fine dent or capillary of the surface of the fiberglass layer 42 and fill up the rough surface of the covering material. Therefore, after patterned, the hardening layer, fiberglass layer and covering material are well combined with each other.

Figure 8:
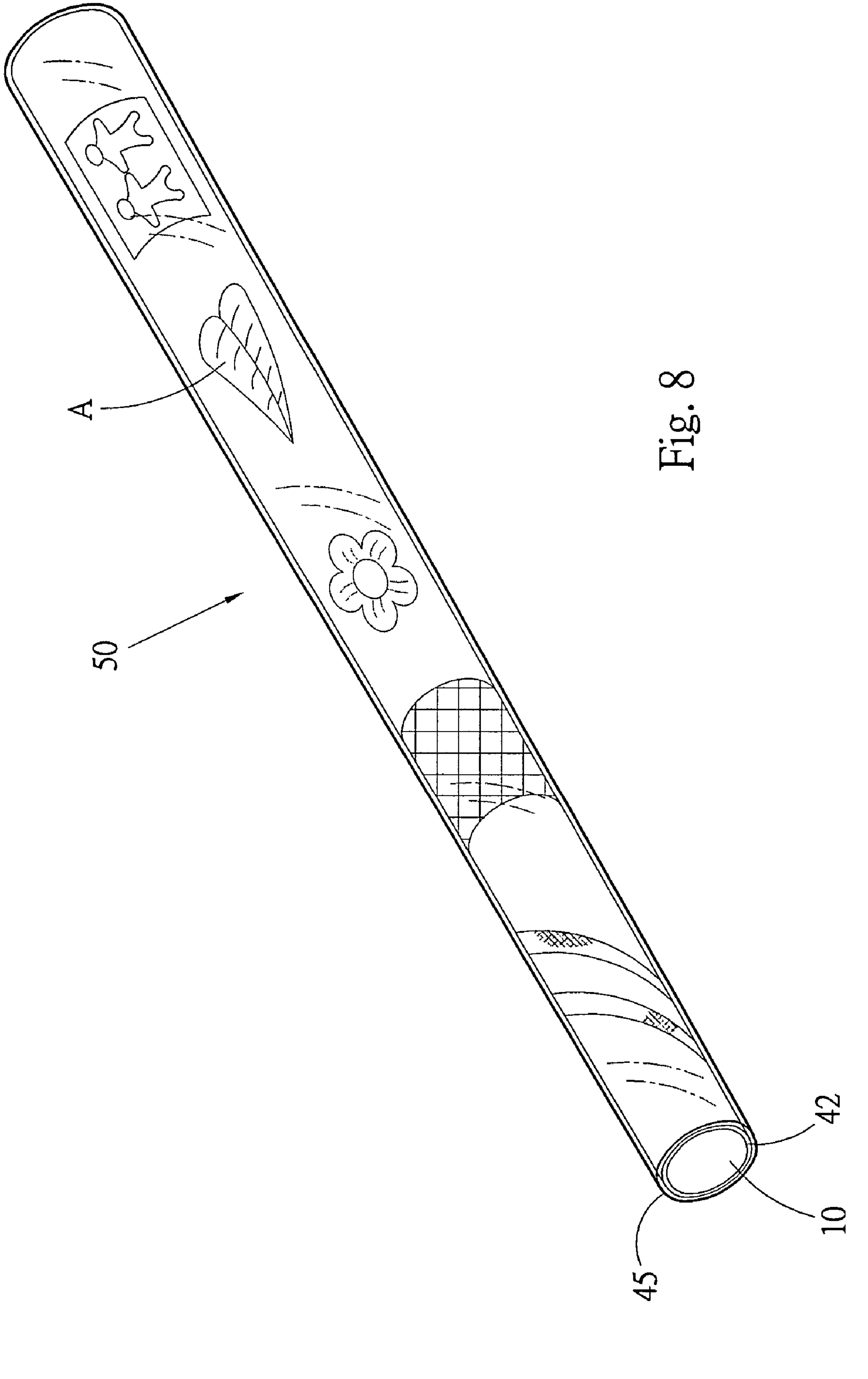
FIG. 8 is a perspective view of the product of the first embodiment of the present invention according to FIG. 4.

7. Buffing the Wrapping Body to Complete the Product:

After the above steps, the surface of the wrapping body 40 is rough. Therefore, the surface of the hardening layer 45 is further buffed to polish the surface and complete the product 50 of the present invention as shown in FIG. 8.

In step 6, in the case that the resin is many times painted on the surface of the wrapping body, each time after the resin is painted, the buffing operation can be performed once.

Finally, a polishing paint can be painted on the surface of the hardening layer, whereby the surface of the product is not only polished and transparent, but also is bright.

Through the above steps, an article having figures is made. Different covering materials can be selected to present different stripes (such as stripes of fabric and leaf and the stripes formed by the cloth strip and thread wound around the substrate) and figures (such as petal, fabric, picture, photograph or characters). The figures of the article are the covering material's own characteristics so that the figures of the article are rich and variable without monotonousness.

The hardening layer on outer face of the product is transparent so that a user can see the stripes and figures of the covering materials through the hardening layer. The stripes and figures are enclosed in the hardening layer and thus protected from being worn. In addition, the hardening layer has a considerable hardness and is anti-abrasion and heat-resistant. Also, the hardening layer is antifreeze and humidity-resistant.

Moreover, in the case that the covering material is a natural material, a natural figure/stripe is presented. This is unachievable by prior art.

In addition, the covering material is a true thing so that the presented figure/stripe is solid.

Even if the same covering material is selected, such as leaves or fabrics, the stripes and profiles of the leaves will not be totally identical. During the forming procedure of each article, the covering materials can be placed in different positions and arranged in different patterns. In addition, the forming conditions of the products will slightly vary. Therefore, with the same covering material, the figures/stripes of the products will not totally identical to each other. Accordingly, each product is unique. A personal article such as a photograph or a personal draft can be used to form the figure. In this case, the product will be an exclusive personal article.

It should be noted that the figures/stripes can be locally formed on a substrate. For example, the figures/stripes can be formed on a specific part of a bicycle frame or a racket. Accordingly, the substrate only needs to have a part with regular geometric solid pattern for making the figures/stripes thereon. It is unnecessary for the substrate to entirely have regular profile.

Figure 9:
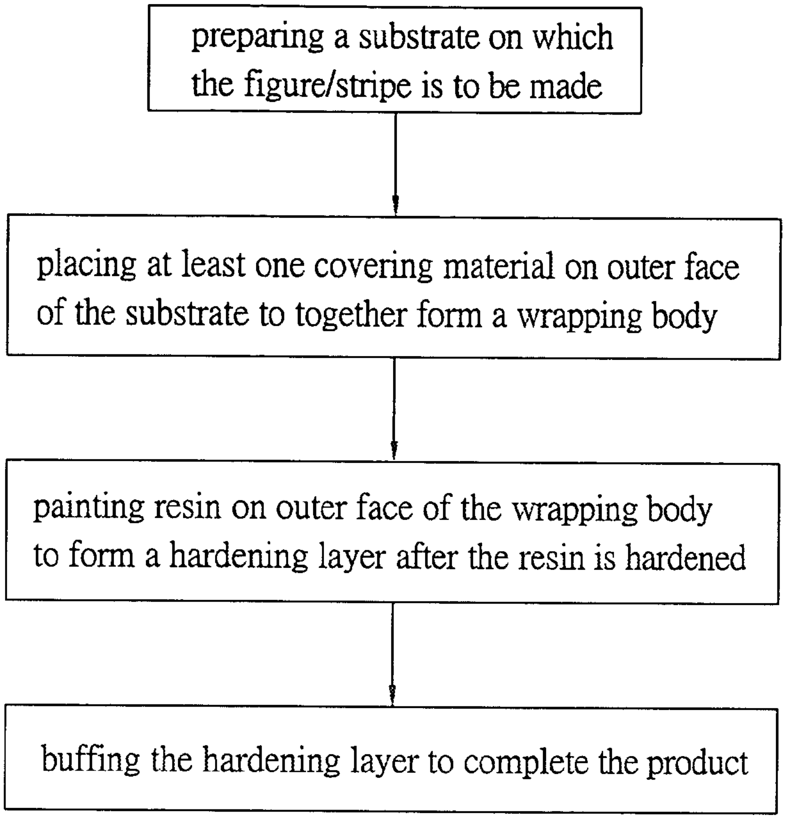
FIG. 9 is a flow chart of a second embodiment of the present invention.
Figure 10:
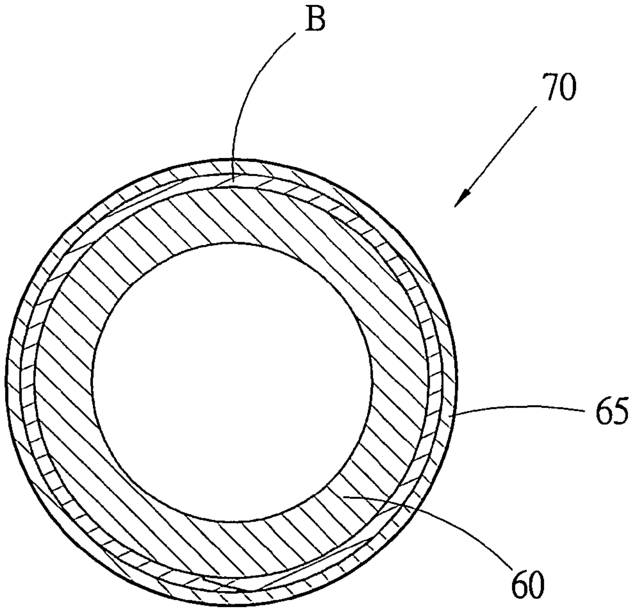
FIG. 10 is a sectional view of the product of the second embodiment of the present invention according to FIG. 9.

FIG. 9 is a manufacturing flow chart of another embodiment of the present invention, which includes steps of:

1. Preparing a Substrate on which the Figure/Stripe is to be Made:

Referring to FIG. 10, the substrate 60 of this embodiment is identical to the first embodiment and is any patterned article used in various fields. The article has a fixed profile. However, the shape and material of the article are not specifically limited.

2. Placing at Least One Covering Material on Outer Face of the Substrate:

The covering material B of this embodiment is identical to the first embodiment and can be any thin piece made of various materials. The covering material B will not be repeatedly described hereinafter. The substrate is wrapped with one or multiple covering materials to form a wrapping body.

3. Painting Resin on Outer Face of the Wrapping Body to Form a Hardening Layer After the Resin is Hardened:

The outer face of the wrapping body is painted with epoxy. Identically, the resin can be painted onto the wrapping body or the wrapping body can be dipped into the resin. The resin can be repeatedly painted onto the wrapping body to totally cover the covering material B. The resin can fill up the fine dent or capillary of the surface of the covering material.

Thereafter, at room temperature, after about eight hours, at 80° C., after about two hours, the resin is hardened and patterned. Accordingly, the outer circumference of the wrapping body is formed with a transparent hardening layer 65.

4. Buffing the Hardening Layer to Complete the Product:

After the above steps are completed, the surface of the wrapping body is rough. Therefore, the surface of the hardening layer 65 is buffed to polish the surface and complete the product 70 of this embodiment.

In step 3, each time after the resin is painted, the buffing operation is performed once.

After buffed, a polishing paint is painted on the surface of the hardening layer, whereby the surface of the product is not only polished and transparent, but also is bright.

In this embodiment, the figures/stripes can be totally or partially formed on the surface of the article.

This embodiment has the same advantages as the first embodiment. That is, the figures of the article are the covering material's own characteristics so that the figures of the article are rich. The stripes and figures are protected from being worn and kept bright and complete. In addition, the figures/stripes of the article are natural, unique and solid.

The above embodiments are only used to illustrate the present invention, not intended to limit the scope thereof.

What is claimed is:

1. A method for making figures/stripes on an article, comprising steps of:

(1) preparing an article as a substrate on which the figures/stripes are to be made;

(2) wrapping a portion or portions of the surface of the substrate with a fiberglass fabric drenched with resin, the figures/stripes being to be made on the portion or portions;

(3) placing at least one covering material on an exterior of the fiberglass fabric, the at least one covering material forming the figures/strips, the at least one covering material being a thin or slender body independent from the substrate, after the substrate is wrapped by the fiberglass fabric and the covering material, the substrate, fiberglass fabric and the covering material together forming a wrapping body;

(4) using a binding means to bind the outer circumference of the wrapping body, the binding means being wound around the wrapping body to harden and pattern the fiberglass fabric;

(5) taking off the binding means after the wrapping body is hardened and patterned, the fiberglass fabric being hardened and patterned to form an inner layer, the covering material being positioned on the outer face of the inner layer;

(6) painting an outer resin on an exterior of the wrapping body and forming a transparent hardening layer around the wrapping body by hardening the outer resin; and (7) buffing the hardening layer and completing the article which presents the figures/stripes of the covering material.

2. The method for making the figures/stripes on the article as claimed in claim 1, wherein the covering material is natural material.

3. The method for making the figures/stripes on the article as claimed in claim 1, wherein the covering material is artificial material.

4. The method for making the figures/stripes on the article as claimed in claim 1, wherein the covering material is a material containing fibers.

5. The method for making the figures/stripes on the article as claimed in claim 4, wherein the covering material is a material selected from a group consisting of fabric, paper, leaf, wood and bamboo.

6. The method for making the figures/stripes on the article as claimed in claim 1, wherein the covering material is selected from a group consisting of metal and non-iron metal material.

7. The method for making the figures/stripes on the article as claimed in claim 1, wherein the covering material is polymer material.

8. The method for making the figures/stripes on the article as claimed in claim 1, wherein the thickness or diameter of the covering material is smaller than 2 mm.

9. The method for making the figures/stripes on the article as claimed in claim 1, wherein the substrate is a patterned article having a certain hardness, the article totally or partially having a regular solid geometric profile.

10. The method for making the figures/stripes on the article as claimed in claim 9, wherein the substrate is an article made of a material selected from a group consisting of iron and non-iron metal material.

11. The method for making the figures/stripes on the article as claimed in claim 9, wherein the substrate is an article made of polymer material.

12. The method for making the figures/stripes on the article as claimed in claim 9, wherein the substrate is an article made of wooden or bamboo material.

13. The method for making the figures/stripes on the article as claimed in claim 9, wherein the substrate is an article made of ceramic/enamel material.

14. The method for making the figures/stripes on the article as claimed in claim 1, wherein in step 4, the wrapping body is hardened and patterned at room temperature.

15. The method for making the figures/stripes on the article as claimed in claim 1, wherein the wrapping body is hardened and patterned at a temperature below the critical heat-resistant temperature of the substrate.

16. The method for making the figures/stripes on the article as claimed in claim 1, wherein in step 6, the outer resin is hardened at room temperature.

17. The method for making the figures/stripes on the article as claimed in claim 1, wherein in step 6, the outer resin is hardened at a temperature above room temperature below 150° C.

18. The method for making the figures/stripes on the article as claimed in claim 1, wherein in step 7, after the hardening layer is buffed, at least one layer of paint is painted on the surface of the hardening layer.

19. The method for making the figures/stripes on the article as claimed in claim 18, wherein the paint is a polishing paint.

20. The method for making the figures/stripes on the article as claimed in claim 1, wherein in step 6, the outer resin has the same components as the resin with which the fiberglass fabric is drenched.

21. The method for making the figures/stripes on the article as claimed in claim 1, wherein the figures/stripes are locally made on the surface of the substrate.

22. The method for making the figures/stripes on the article as claimed in claim 1, wherein the figures/stripes are made on the total surface of the substrate.

* * * * *